United States Patent [19]

Cheetham et al.

[11] 4,001,169
[45] Jan. 4, 1977

[54] COLORATION OF POLYESTERS

[75] Inventors: Ian Cheetham; Kenneth Dunkerley; Colin William Greenhaigh; James Albert Moyse; David Francis Newton, all of Manchester, England

[73] Assignee: Imperial Chemical Industries Limited, London, England

[22] Filed: Feb. 26, 1974

[21] Appl. No.: 445,837

[30] Foreign Application Priority Data

Mar. 2, 1973    United Kingdom ............ 10234/73

[52] U.S. Cl. .............................. 260/40 P; 260/378; 260/380
[51] Int. Cl.² .......................................... C08K 5/08
[58] Field of Search ................. 260/40 P, 378, 379, 260/380

[56] References Cited

UNITED STATES PATENTS

| | | |
|---|---|---|
| 2,050,704 | 8/1936 | Koeberle et al. ............. 260/378 X |
| 2,571,319 | 10/1951 | Waters et al. ................ 260/40 P X |
| 3,215,710 | 11/1965 | Hindermann et al. ............. 260/380 |
| 3,694,402 | 9/1972 | Essam .......................... 260/40 P X |
| 3,724,998 | 4/1973 | Gehrke et al. ..................... 260/380 |

FOREIGN PATENTS OR APPLICATIONS 1,250,983    10/1971    United Kingdom

*Primary Examiner*—Donald E. Czaja
*Assistant Examiner*—S. M. Person

[57] ABSTRACT

Process for mass coloring synthetic linear polyesters which comprises incorporating into the preformed polyester one or more dyestuffs of the formulae:-

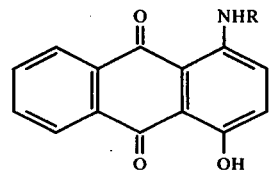

and

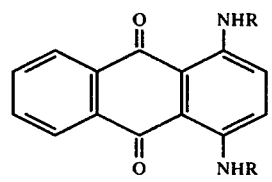

wherein R is a group of the formula

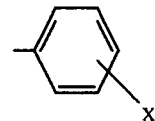

and X is a lower alkoxy, substituted lower alkoxy, lower alkylamino or acylamino radical which is free from hydroxy or carboxylic acid groups.

6 Claims, No Drawings

COLORATION OF POLYESTERS

This invention relates to the mass colouration of polyesters, especially polyethylene terephthalate, with certain anthraquinone dyestuffs.

According to the invention there is provided a process for mass colouring synthetic linear polyesters which comprises incorporating into the preformed polyester mixtures of dyestuffs of the formulae

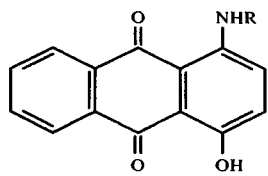

and

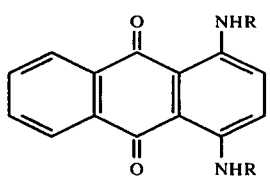

wherein R is a group of the formula

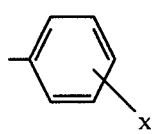

and X is a lower alkoxy, substituted lower alkoxy, lower alkylamino or acylamino radical which is free from hydroxy, or carboxylic acid groups.

Throughout this specification the terms "lower alkyl" and "lower alkoxy" are used to denote alkyl and alkoxy radicals respectively containing from 1 to 4 carbon atoms.

As examples of the lower alkoxy radicals represented by X there may be mentioned methoxy, ethoxy, propoxy and butoxy; as examples of the substituted lower alkoxy radicals represented by X there may be mentioned lower alkoxy lower alkoxy such as β-ethoxyethoxy and γ-methoxy-propoxy; as examples of the lower alkylamino radicals represented by X there may be mentioned methylamino and diethylamino; and as examples of the acylamino radicals represented by X there may be mentioned lower alkylcarbonylamino radicals such as acetylamino and propionylamino, lower alkoxycarbonylamino radicals such as ethoxycarbonylamino, phenylcarbonylamino radicals such as benzoylamino, lower alkyl sulphonylamino radicals such as methylsulphonylamino, and substituted benzene sulphonylamino radicals such as toluenesulphonylamino.

The process of the invention can be conveniently carried out by a "chip-coating process" in which the dyestuffs in finely divided form are intimately mixed, for example by tumbling with chips or granules of the polyester. The dyestuffs can be used in the form of a powder or as a dispersion in a liquid medium, for example water or ethylene glycol, in which case the polyester is subsequently dried prior to extrusion to remove the liquid. The coloured chips of the polyester can then be melted and extruded into filaments or other shaped articles in conventional equipment.

It is, however, preferred that the dyestuffs be added to the molten polyester just prior to its extrusion into filaments or other shaped articles. For this purpose it is preferred to use the pure dyestuffs that is to say the dyestuffs are free, or at least substantially free, from inorganic salts, dispersing agents or other additives which are normally present in the commercial form of disperse dyestuffs. Whilst the dyestuffs can be added in the form of a dispersion in a liquid which is compatible with the polyester, the presence of such a liquid in the coloured polyester sometimes results in an adverse effect on the physical properties of the polyester. It is therefore preferred to add the dyestuffs in molten form, or, alternatively, in the form of granules or tablets either to the molten polyester or to chips or granules of the polyester before the polyester is melted. The rate of addition of the dyestuffs to the polyester may be controlled by metering so as to ensure the even addition of the dyestuffs to the polyester which is essential to obtain uniform colouration of the extruded polyester.

If desired the dyestuffs can be used in the form of granules or tablets having a coating comprising a thin layer of polymeric material especially a polyester.

The dyestuffs in which X is lower alkoxy or substituted lower alkoxy can be obtained by the condensation of mixtures or quinizarin and leucoquinizarin with the appropriate amine of the formula

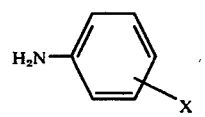

the reaction optionally being carried out in the presence of a solvent such as ethanol and in the presence of an acid catalyst.

The dyestuffs in which X is lower alkylamino or lower acylamino can be obtained by substituting phenylene diamine

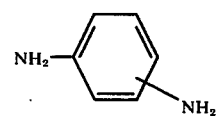

for the substituted aniline in the above condensation and subsequently alkylating or acylating the free amino group.

These reactions result in mixtures of the dyestuffs of the formulae

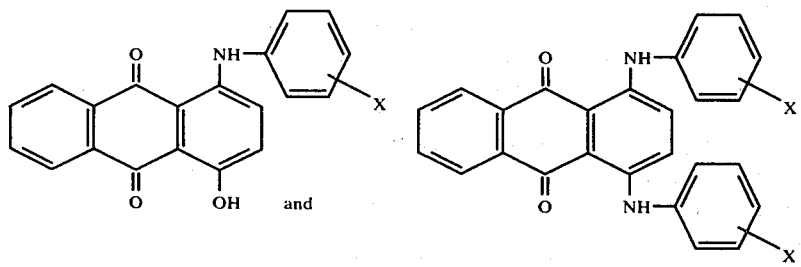

but by control of the temperature and time of reaction, mixtures varying in proportions from virtually 100% of the mono arylamino derivatives to approaching 100% of the diarylamino derivative, can be obtained.

By the process of the invention polyester fibres are obtained which are coloured in violet to blue green shades possessing excellent fastness to light, to wet treatments and to dry heat treatments.

Because these dyestuffs contain no groups which react readily with polyesters, when they are added to the polyester in the manner described, they do not degrade the polyester to any marked extent and therefore do not effectively reduce the intrinsic viscosity of the polyester.

The invention is illustrated but not limited by the following Examples in which the parts and percentages are by weight.

EXAMPLE 1

1 Part of a dyestuff mixture comprising approximately 80% of 1-hydroxy-4(4-n-butoxyanilino-)-anthraquinone and approximately 20% of 1,4-di-(4-n-butoxyanilino-)-anthraquinone in finely divided form is tumbled with 100 parts of polyethylene terephthalate in the form of chips, and the resulting mixture is then melted and spun into filaments in conventional melt-spinning equipment.

The resulting blue filaments have excellent fastness properties.

EXAMPLE 2

Polyethylene terephthalate in the form of chips is converted into filament form by passage through a screw extruder, and the polymer is coloured by continuously adding the dyestuff mixture used in Example 1 in granular form to the extruder through a suitable feed pocket at such a rate as corresponds to 1 part of dyestuff for each 100 parts of polymer passing through the extruder.

The filaments are thereby uniformly coloured a blue shade having excellent fastness properties.

In place of the dyestuffs used in the above Example there can be used any of the dyestuff listed in the following Examples whereby the filaments are coloured in the shade indicated in each example.

EXAMPLE 3

A mixture comprising approximately 80% of 1-hydroxy-4-(4-β-ethoxyethoxyanilino-)-anthraquinone and approximately 20% of 1,4-di(4-β-ethoxyethoxyanilino-)-anthraquinone Shade:- blue.

EXAMPLE 4

A mixture comprising 82% of 1-hydroxy-4-(4-methylaminoanilino-)-anthraquinone and 18% of 1,4-di(4-methylaminoanilino-)-anthraquinone. Shade:- blue.

EXAMPLE 5

A mixture of 85% of 1-hydroxy-4-(4-acetylaminoanilino-)-anthraquinone and 15% of 1,4-di-(4-acetylaminoanilino-)-anthraquinone. Shade:- reddish blue.

EXAMPLE 6

As for Example 5 except that the mixture consists of 50% of each component. Shade:- navy blue.

EXAMPLE 7

A mixture comprising approximately 98% of 1-hydroxy-4-(4-propionylaminoanilino-)-anthraquinone and approximately 2% of 1,4-di-(4-propionylaminoanilino-)-anthraquinone. Shade:- violet.

EXAMPLE 8

A mixture comprising 82% of 1-hydroxy-4-(-4-propionylaminoanilino-)-anthraquinone and 18% of 1,4-di-(-4-propionylaminoanilino-)-anthraquinone. Shade:- blue.

EXAMPLE 9

A mixture comprising 82% of 1-hydroxy-4-(-4-ethoxy carbonylaminoanilino-)-anthraquinone and 18% of 1,4-di-(4-ethoxycarbonylaminoanilino-)-anthraquinone. Shade:- blue.

EXAMPLE 10

A mixture comprising 82% of 1-hydroxy-4-(-4-benzoylaminoanilino-)-anthraquinone and 18% of 1,4-di-(4-benzoylaminoanilino-)-anthraquinone. Shade:- dull blue.

EXAMPLE 11

A mixture comprising approximately 80% of 1-hydroxy 4-(-4-toluenesulphonylaminoanilino)-anthraquinone and approximately 20% of 1,4-di-(-4-toluenesulphonylaminoanilino)-anthraquinone. Shade:- blue.

What we claim is:

1. A process for mass colouring synthetic linear polyesters which process comprises incorporating into a preformed polyester a mixture comprising a first dyestuff of the formula:

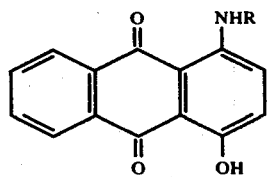

and a second dyestuff of the formula

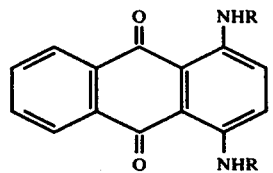

wherein R is a group of the formula

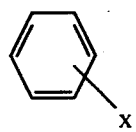

and X is an acylamino radical which is free from hydroxy or carboxylic acid groups.

2. A process, as claimed in claim 1, wherein the mixture of dyestuffs is added in the form of granules or tablets.

3. Process as claimed in claim 2 wherein the rate of addition of the tablets or granules of the dyestuff to the molten polyester is controlled by metering.

4. Process as claimed in claim 2 which is effected in a screw extruder, the tablets or granules of the dyestuff being added through a feed pocket.

5. Process as claimed in claim 1 wherein the polyester is polyethyleneterepthalate.

6. A polyester colored by a process as claimed in claim 1.

* * * * *